To the extent that liquid hydrocarbon or water may be present in the gas exiting from the tower at its outlet 34, they are separated out by the outlet scrubber 70, which functions in the same manner as the inlet scrubber 50 and in addition makes up for any lack of mist eliminator in the contactor tower 12. It is therefore useful in the event of a process upset which might otherwise permit slurry to be carried downstream.

Make-up water for the contactor tower solution may be introduced, using the pumped inlet 22. Thickening is remedied by conventionally injecting a thinning agent or viscosity-reducing agent into the vessel through a conventional chemical injection, not shown. If foaming occurs it can be substantially reduced or eliminated by similarly injecting a conventional defoaming agent.

Foaming can also be alleviated by reducing the superficial gas velocity of the sour gas entering the vessel. As a guide to the gas velocity which may be employed, this may be calculated from the empirical formula:

$$V_s = 2.09[Rho_e - Rho_g/Rho_g]^{0.325}$$

in which:
$V_s$ = maximum allowable superficial velocity feet per minute
$Rho_e$ = slurry density—pounds per cu. ft.
$Rho_g$ = gas density—pounds per cu. ft.

This guide is based on operation of the vessel at 100 pounds of particulate reactant material per barrel of water. With lesser amounts of reactant material the allowable superficial gas velocity may be increased, and with higher amounts it may be reduced, bearing in mind the desired rate of gas rise through the slurry.

While precise correlation between the actual dynamic liquid level of the slurry and the location of the confining screen 30 may not be maintainable continuously, it should be recognized that locating it too low will provide a liquid volume above it with lessened effectiveness for scavenging the hydrogen sulfide; while locating the screen too high will waste the headspace. Headspace is necessary to permit the mist-like particles of liquid, which break from the surface at the dynamic level, to precipitate and drop out of the gas. Apparently because of the low rate of gas rise through the liquid, the adequate headspace itself eliminates the need for demisting equipment, thus lowering the cost of the apparatus and of its maintenance.

It is understood that when the slurry of a reactant material has been substantially exhausted, the gas inflow must be cut off, drained through the removable cap 18 and disposed of, and the contactor vessel recharged with a fresh slurry before the gas stream is again directed through the system.

The various potential uses of the present apparatus, and modifications thereof to serve such uses, will from this disclosure be apparent to person skilled in the art.

INDUSTRIAL APPLICABILITY

The most significant industrial applicability of the present invention is believed to be in the provision of apparatus for sweetening sour natural gas from wells which are located at remote points or for other reasons do not justify the far greater expense of a commercial amine plant. However, because of relatively low initial costs and minimum maintenance requirements, its utilization in other applications may likewise prove to be of great value.

The embodiments of the invention in which an exclusive property or privilege is claimed are defined as follows:

1. For use in the line of flow from a natural gas well to a pipeline, a system of apparatus comprising in series, inlet scrubber means to separate out water and liquid hydrocarbons, means to raise the temperature of the gas so scrubbed sufficiently to avoid hydrate formation and hydrocarbon liquefaction in the contactor tower next defined, and a contactor tower including gas inlet means in its lower portion, top gas outlet means, a headspace below said top outlet means, and a downward-confining screen positioned at a design dynamic liquid level of a slurry of reactant particles to be filled in the tower, whereby packer-spacer material may be filled therein to extend upward from the level of the gas inlet means continuously to the screen and be held confined downward by the screen as such slurrly expands to the dynamic liquid level on passage of gas therethrough.

2. A system of apparatus as defined in claim 1, together with outlet scrubber means to separate out liquids interpositioned in the gas stream between the outlet means of the contactor tower and the pipeline.

3. A system of apparatus as defined in claim 1, in which said means to raise the temperature of the gas comprises means to raise its temperature substantially 6° C.

4. A system of apparatus as defined in claim 1, wherein the contactor tower is so proportioned that after having been filled with a reactant slurry together with such fill of packer-spacer material to and held down by the screen, and to such static liquid level, the slurry will expand and rise to such dynamic liquid level as the gas passes therethrough at a rate sufficiently slow to avoid foaming of the slurry.

5. A system of apparatus as defined in claim 1, said contactor tower being so proportioned that the volume from its bottom to the dynamic liquid level is substantially 1.5 times the volume to said static liquid level.

6. A system of apparatus as defined in claim 1, said contactor tower being so proportioned that the volume from its bottom to the dynamic liquid level is in the range of 1.3 to 1.7 times the volume to said static liquid level.

* * * * *

TUBULAR REACTION FURNACE FOR INDIRECT HEATING OF CRACKABLE FLUIDS

BACKGROUND OF THE INVENTION

This type of tubular reaction furnace consists of a building-like steel structure. Walls, ceiling and floor have a refractory lining. The furnace is equipped with a plurality of vertical reaction tubes filled with a catalyst and arranged in several rows. In order to achieve uniform withdrawal of the flue gas, a certain number of parallel flue gas ducts are arranged on the floor and connected to a common header where the gas collects. Then the gas passes a heat exchanger and is discharged into the atmosphere via a flue gas stack. Since the flue gas ducts are arranged in the reaction furnace and heated from all sides, they consist of a self-supporting structure of refactory ceramic material or bricks.

Off-shore fields of natural gas or oil offer the possibility of converting such raw materials into intermediate or final products at the place of the resources, i.e. on floating plant platforms. For this purpose, tubular reaction furnaces for cracking hydrocarbons are mounted on special vessels which are called floating plant platforms. Since such a platform is exposed to considerable internal forces depending on the sea waves, the components must withstand major dynamic forces, especially the flue gas ducts of the furnace, because they consist of heavy ceramic material. The weight of these components can in fact cause a collapse of the structure depending on the angle of inclination from the vertical position.

SUMMARY OF THE INVENTION

The aim of the invention is to design a flue gas withdrawing system for tubular reaction furnaces mainly installed on floating plant platforms, the system being such that it is able to withstand external forces without damage to the refractory material.

The aim of the invention is achieved by arranging a plurality of parallel tubes in the form of a register used for the ceiling and side walls which thus form a flue gas duct, by attaching the tubular headers to the external side of the reaction furnace, by applying an internal and external heat insulation on the tube register walls, and by connecting the tubular header to a cooling system.

According to further embodiments of the invention, each flue gas duct essentially consists of a flue-gas-tight wall and a register with internal and external heat insulation of the same thickness.

The advantages of the invention are that the flue gas ducts have a cooling jacket which reinforces the system and thus ensures the stability required for the structure. Moreover, it is also possible to use soft insulating materials which are normally not suited for self-supporting structures. Unlike the purely ceramic structures, the inventive ducts are suitable for foot traffic.

BRIEF DESCRIPTION OF THE DRAWINGS

The above objects and advantages of the invention will become readily apparent to one skilled in the art from reading the following detailed descriptions of a preferred embodiment of the invention when considered in the light of the accompanying drawing 1, in which.

DETAILED DESCRIPTION OF PREFERRED EMBODIMENT OF THE INVENTION

Figure 1:
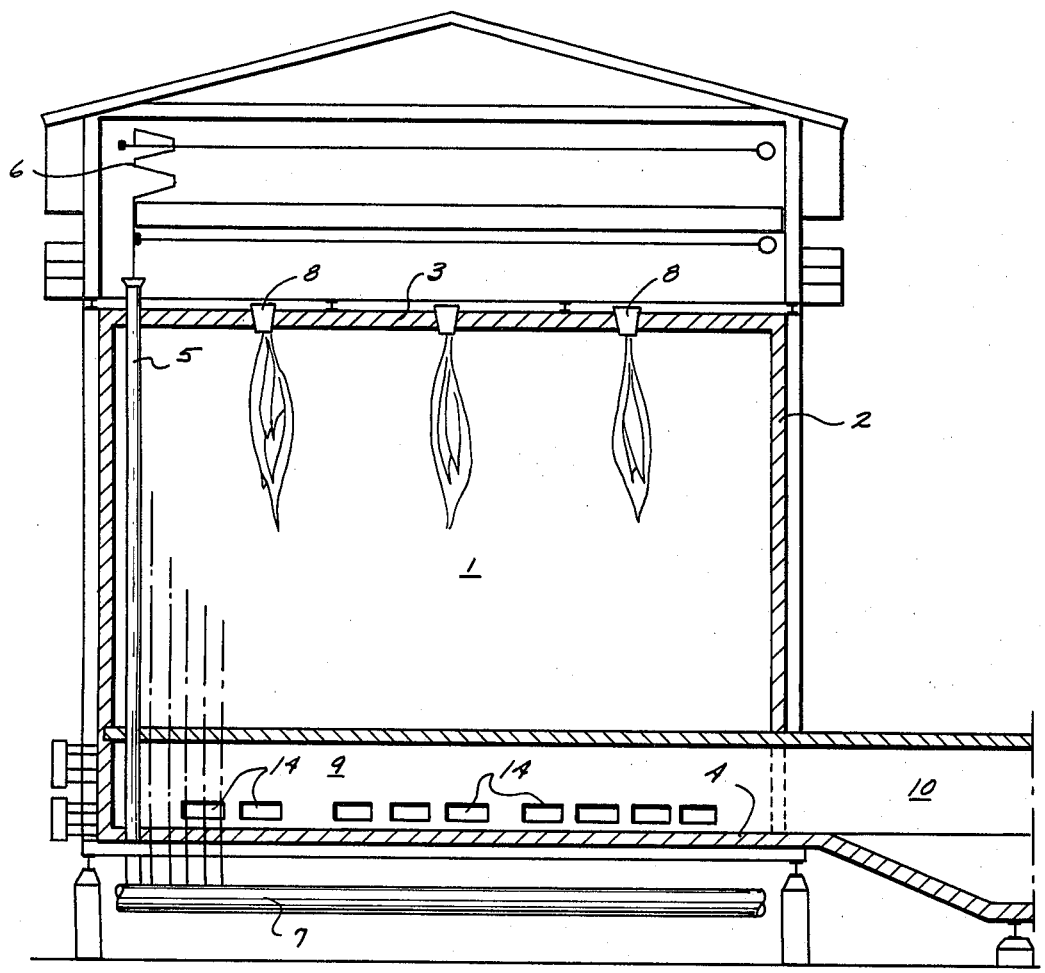
FIG. 1 is a cross-sectional view of a tubular reaction furnace embodying the features of the invention.

According to FIG. 1, the tubular reaction furnace is a steel structure consisting of heat-insulated walls 2, ceiling 3 and furnace floor 4. The vertical reaction tubes 5 are filled with a catalyst and arranged in parallel rows. The upper end of each row penetrates the ceiling and is connected to inlet header 6, while the lower end of the tubes 5 penetrates the furnace floor 4 and is connected to the product gas header 7. The tube rows are heated by a plurality of burners 8 arranged in the furnace ceiling 3. In order to heat the entire length of the tubes 5 in a uniform manner, the flue gases with a temperature of approximately 1000° C. are withdrawn at a constant rate via a plurality of parallel flue gas ducts 9 mounted on the furnace floor 4. The duct length corresponds to the length of the tubular reaction furnace. The flue gas ducts 9 are connected to the external flue gas header 10.

Figure 2:
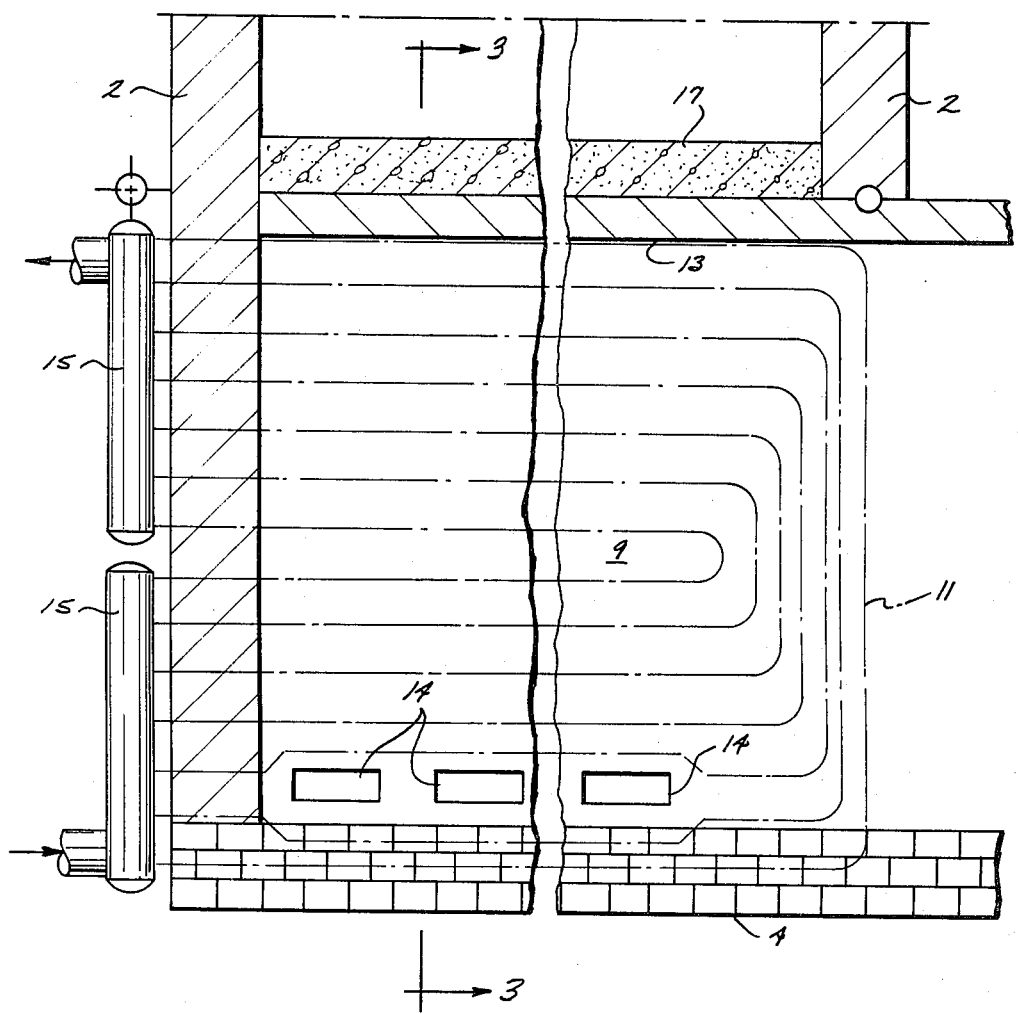
FIG. 2 is an enlarged fragmentary sectional view of a flue gas duct of the furnace illustrated in FIG. 1.
Figure 3:
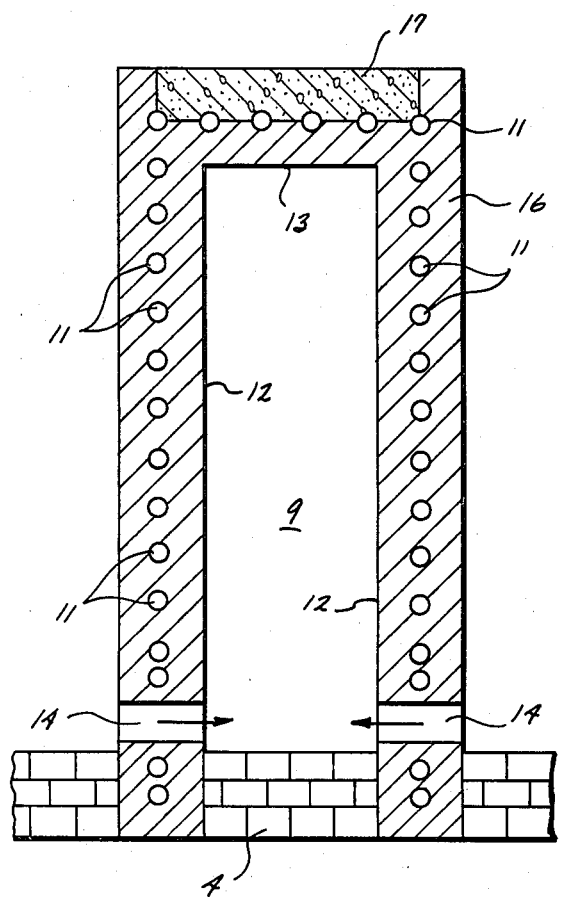
FIG. 3 is a sectional view of a flue gas duct taken along line 3—3 of FIG. 2.

According to FIGS. 2 and 3, each flue gas duct 9 consists of one or several tube registers 11 which form the side walls 12 and the ceiling 13. In order to fix the duct 9 properly in the furnace floor 4, the registers 11 forming the side walls 12 penetrate the floor 4 and are attached to the bottom beam of the steel structure. The flue gas ducts 9 thus have the required stability. The openings 14 of the tube register are arranged near the floor 4 in such a manner that the flue gases in the furnace chamber are routed through the ducts. The tubes of the register 11 may have various cross-sections, with or without fins. It is essential that side walls and ceiling be flue-gas-tight. There is not any other preferred arrangement of the tubes such as a vertical or horizontal arrangement to the longitudinal axis of the flue gas duct. Moreover, the tube register must be tight and resist dynamic loads.

In order to protect the tube register against the flue gas heat, it has an external and internal insulation 16 of ceramic material, bricks or fibres. The insulation thickness depends on the gas heat. If the upper end of the tube register is covered with a layer of insulating concrete 17, the flue gas duct 9 is suitable for foot traffic.

The tubular headers are connected to a cooling water system such as a boiler feed water system for preheating the water. The tube register must be cooled such that the material strength does not deteriorate. The heat recovered by the boiler feed water system is recycled to the tubular reaction furnace, for instance for preheating the combustion air.

What we claim is:

1. In a tubular reaction furnace of the type having a firing chamber defined by a ceiling mounting a plurality of internal burners, a floor and including a plurality of vertically oriented reaction tubes arranged in the firing chamber for the indirect heating of crackable fluids, particularly for cracking hydrocarbons used for the extraction of gases rich in CO and $H_2$, the improvement comprising:

a plurality of flue gas ducts mounted on the floor of the furnace, each flue gas duct including opposed sidewalls and a ceiling;

said sidewalls and ceiling each having a plurality of parallel arranged tubes forming a tube register;

means for insulating the internal and external surfaces of said tube register;

and tubular headers operatively connected to said tube register for the circulation of a cooling medium therethrough.

2. A tubular reaction furnace according to claim 1 wherein said flue gas duct is a flue-gas-type wall.

3. A tubular reaction furnace according to claims 1 or 2 wherein said internal and external heat insulation have approximately the same thickness.

4. A tubular reaction furnace according to claims 1 or 2 wherein said tube register penetrates the furnace floor and is attached to the steel structure of the furnace floor.

* * * * *